(12) United States Patent
Peng et al.

(10) Patent No.: US 10,350,981 B2
(45) Date of Patent: Jul. 16, 2019

(54) MOBILE ROBOT TRIANGLE CHASSIS ASSEMBLY

(71) Applicant: SICHUAN ARTIGENT ROBOTICS EQUIPMENT CO., LTD., Chengdu, Sichuan (CN)

(72) Inventors: Bei Peng, Sichuan (CN); Yi Chen, Sichuan (CN); Jing Liu, Sichuan (CN)

(73) Assignee: SICHUAN ARTIGENT ROBOTICS EQUIPMENT CO., LTD, Chengdu, Sichuan (CN)

( * ) Notice: Subject to any disclaimer, the term of this patent is extended or adjusted under 35 U.S.C. 154(b) by 111 days.

(21) Appl. No.: 15/558,194

(22) PCT Filed: Aug. 25, 2016

(86) PCT No.: PCT/CN2016/096630
§ 371 (c)(1),
(2) Date: Sep. 14, 2017

(87) PCT Pub. No.: WO2018/000559
PCT Pub. Date: Jan. 4, 2018

(65) Prior Publication Data
US 2018/0236862 A1 Aug. 23, 2018

(30) Foreign Application Priority Data

Jun. 27, 2016 (CN) .......................... 2016 1 0490447

(51) Int. Cl.
| | | |
|---|---|---|
| *B60K 1/02* | (2006.01) | |
| *B25J 5/00* | (2006.01) | |
| *B60K 1/04* | (2019.01) | |
| *B60K 17/04* | (2006.01) | |
| *B62D 11/04* | (2006.01) | |
| *B62D 61/06* | (2006.01) | |
| *B60K 1/00* | (2006.01) | |

(Continued)

(52) U.S. Cl.
CPC ................. *B60K 1/02* (2013.01); *B25J 5/007* (2013.01); *B60K 1/00* (2013.01); *B60K 1/04* (2013.01);
(Continued)

(58) Field of Classification Search
CPC ....... B60L 50/66; B60L 2210/10; B60K 1/02; B60K 1/00; B60K 1/04; B60K 7/0007;
(Continued)

(56) References Cited

U.S. PATENT DOCUMENTS

| | | | | | |
|---|---|---|---|---|---|
| 3,404,746 A | * | 10/1968 | Slay | .......................... | B62D 7/02 104/245 |
| 5,535,843 A | * | 7/1996 | Takeda | ..................... | B25J 5/007 180/200 |

(Continued)

FOREIGN PATENT DOCUMENTS

| | | |
|---|---|---|
| CN | 1618578 A | 5/2005 |
| CN | 101011700 A | 8/2007 |

(Continued)

*Primary Examiner* — Kevin Hurley
*Assistant Examiner* — Gabriela C Craciun

(57) ABSTRACT

A mobile robot triangle chassis assembly is disclosed, which includes a housing, a top plate, an isolation plat, a bottom plate, a power package, multiple support beams and three sets of gear trains. The three sets of gear trains are equilaterally triangularly distributed, each of which includes a motor, a speed reducer, a support frame and an omnidirectional wheel. The mobile robot triangle chassis assembly has a double-layer structure, the three sets of gear trains are located at a lower layer of the double-layer structure, and the power package is located at an upper layer of the double-layer structure, so as to reduce an occupied area of the mobile robot triangle chassis assembly. In the mobile robot triangle chassis assembly, only the bottom of the omnidirectional wheel is located outside the bottom plate, so that components within the mobile robot triangle chassis assembly are protected.

3 Claims, 2 Drawing Sheets

(51) Int. Cl.
  *B60K 7/00*  (2006.01)
  *B62D 15/00*  (2006.01)
  *B60L 53/16*  (2019.01)
  *B60L 50/60*  (2019.01)

(52) U.S. Cl.
  CPC .......... *B60K 7/0007* (2013.01); *B60K 17/043* (2013.01); *B60L 50/66* (2019.02); *B60L 53/16* (2019.02); *B62D 11/04* (2013.01); *B62D 15/00* (2013.01); *B62D 61/06* (2013.01); *B60K 2007/0038* (2013.01); *B60K 2007/0069* (2013.01); *B60L 2210/10* (2013.01); *B60Y 2304/01* (2013.01); *Y10S 901/01* (2013.01)

(58) Field of Classification Search
  CPC .. B60K 2007/0038; B25J 5/007; B62D 61/06; Y10S 901/01
  See application file for complete search history.

(56) References Cited

U.S. PATENT DOCUMENTS

| | | | | |
|---|---|---|---|---|
| 8,397,846 | B2* | 3/2013 | Heimbrock | A61G 7/018 180/19.1 |
| 8,950,522 | B1* | 2/2015 | Lenkman | A61G 7/08 180/12 |
| 9,365,105 | B2* | 6/2016 | Tesar | F16D 13/26 |
| 2017/0305261 | A1* | 10/2017 | Meager | A61G 1/0275 |
| 2017/0334279 | A1* | 11/2017 | Higuchi | B60L 11/1877 |

FOREIGN PATENT DOCUMENTS

| | | |
|---|---|---|
| CN | 102689295 A | 9/2012 |
| CN | 202622792 U | 12/2012 |
| CN | 103480948 A | 1/2014 |
| CN | 105270237 A | 1/2016 |

\* cited by examiner

MOBILE ROBOT TRIANGLE CHASSIS ASSEMBLY

CROSS REFERENCE OF RELATED APPLICATION

This is a U.S. National Stage under 35 U.S.C 371 of the International Application PCT/CN2016/096630, filed Aug. 25, 2016, which claims priority under 35 U.S.C. 119(a-d) to CN 201610490447.0, filed Jun. 27, 2016.

BACKGROUND OF THE PRESENT INVENTION

Field of Invention

The present invention relates to a technical field of robot chassis, and more particularly to a mobile robot triangle chassis assembly.

Description of Related Arts

A driving device of a mobile robot is a mechanism for driving an actuator to move. It drives the robot to act dependent on a power element in accordance with a command signal sent by a control system. An input of the driving device is an electrical signal, and an output thereof is linear and angular displacement. The drive device is mainly electrically driven, such as stepper motor and servo motor. In addition, there are hydraulic, pneumatic and other drive devices. The operating mechanism of the existing ground mobile robot is usually an ordinary wheeled mechanism, which is inconvenient for steering, and poor in shock resistance and buffering, so that it easily leads to the robot tipping. Moreover, the motor of the wheeled mechanism with large driving is large in volume, so it needs to match a larger chassis space.

SUMMARY OF THE PRESENT INVENTION

Aiming at above-mentioned deficiencies in the prior art, the present invention provides a mobile robot triangle chassis assembly, which adopts a triangle setting to enhance a stability of a robot; has a double-layer structure, wherein gear trains are located at a lower layer of the double-layer structure, a power package is located at an upper layer of the double-layer structure; and comprises a bevel gear speed reducer whose outer periphery forms an angle of 90-degree, so as to reduce an occupied area of the mobile robot triangle chassis assembly.

To achieve the above object, the present invention adopts technical solutions as follows. A mobile robot triangle chassis assembly comprises a housing, a top plate, an isolation plate, a bottom plate, a power package, multiple support beams and three sets of gear trains, wherein the top plate and the bottom plate are distributed up and down; the isolation plate is located between the top plate and the bottom plate; the top plate, the bottom plate and the isolation plate are fixedly connected with each other through the support beams; the power package is fixedly connected with the isolation plate.

The three sets of gear trains are equilaterally triangularly distributed, each of which comprises a motor, a speed reducer, a support frame and a omnidirectional wheel, wherein an upper end of the support frame is fixedly connected with a lower surface of the isolation plate; a lower end of the support frame is fixedly connected with an upper surface of the bottom plate; the omnidirectional wheel is located within the support frame and driven by the motor and the speed reducer; the speed reducer is fixedly connected with the support frame; the motor is fixedly connected with the speed reducer; a driver for controlling all the motors is located at the upper surface of the bottom plate; the bottom plate has through-holes; a bottom of the omnidirectional wheel is located outside the through-holes.

The speed reducer is a bevel gear speed reducer, and an outer periphery of the speed reducer is bent at an angle of 90 degrees.

Preferably, an upper end of the support beams is fixedly connected with a lower surface of the top plate, a lower end of the support beams is fixedly connected with the upper surface of the bottom plate, and the isolation plate is fixedly connected with the support beams.

Preferably, the power package comprises a lithium power supply, a DC-DC module, an aerial socket, a switching-charging integrated module and multiple battery flanges, wherein the battery flanges are fixedly connected with an upper surface of the isolation plate; the lithium power supply is fixedly connected with the isolation plate through the battery flanges; the aerial socket is located between the top plate and the isolation plate; the DC-DC module is fixedly connected with the lower surface of the isolation plate; the switching-charging integrated module is located at a surface of the housing.

Beneficial effects of the present invention are as follows. The present invention comprises three sets of gear trains in a triangle distribution to enhance the stability of the robot walking, and a bevel gear speed reducer whose outer periphery is bent at an angle of 90 degrees. The mobile robot triangle chassis assembly has a double-layer structure, the three sets of gear trains are located at a lower layer of the double-layer structure, and the power package is located at an upper layer of the double-layer structure, so as to reduce an occupied area of the mobile robot triangle chassis assembly. In the mobile robot triangle chassis assembly of the present invention, only the bottom of the omnidirectional wheel is located outside the bottom plate, so that components within the mobile robot triangle chassis assembly are protected. Furthermore, the power package is located on the isolation plate higher than the three sets of gear trains to be more sufficiently protected.

Figure 1:
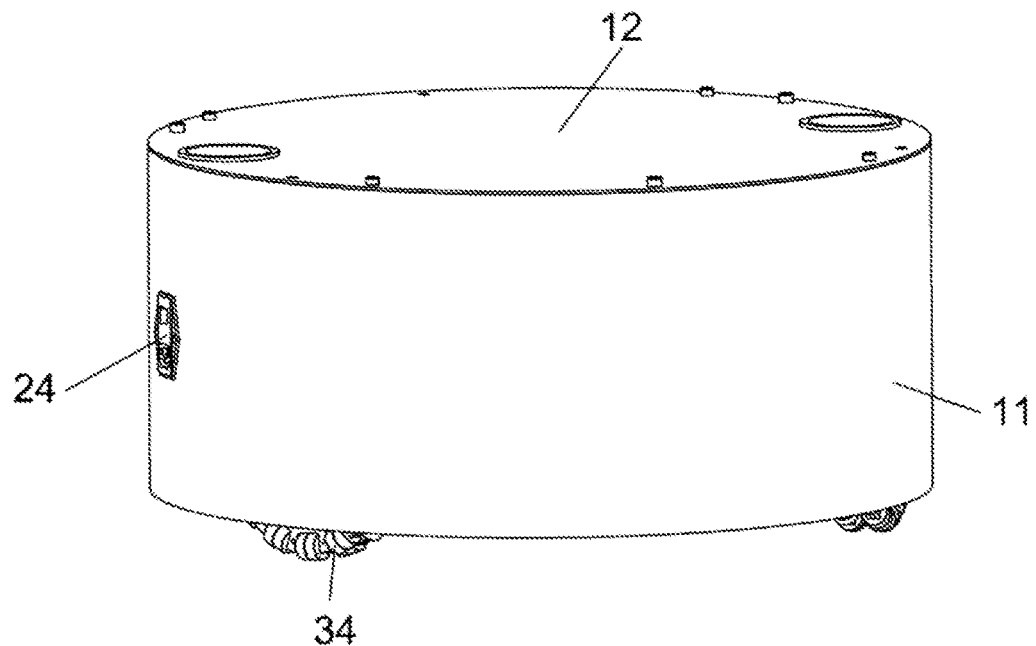
FIG. 1 is a stereogram of a mobile robot triangle chassis assembly of the present invention.

In the drawings, 11: housing; 12: top plate; 13: isolation plate; 14: bottom plate; 141: through-hole; 15: support beam; 21: lithium power supply; 22: DC-DC module; 23: aerial socket; 24: switching-charging integrated module; 25: battery flange; 30: gear train; 31: motor; 32: speed reducer; 33: support frame; 34: omnidirectional wheel; 40: driver.

DETAILED DESCRIPTION OF THE PREFERRED EMBODIMENT

The present invention is further explained with accompanying drawings as follows.

Figure 2:
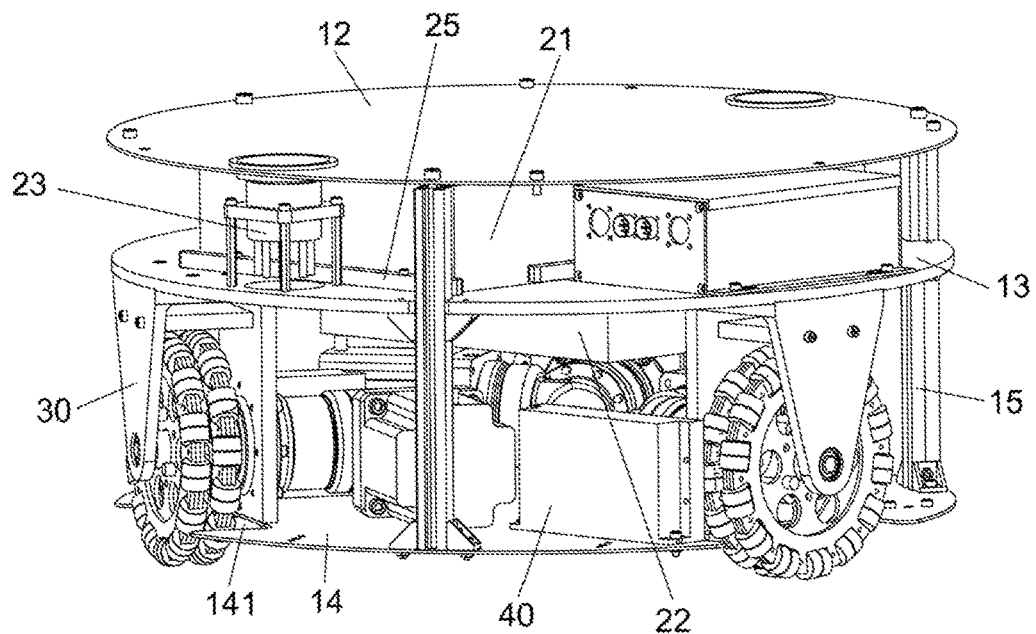
FIG. 2 is a stereogram of the present invention after removal of a housing.
Figure 3:
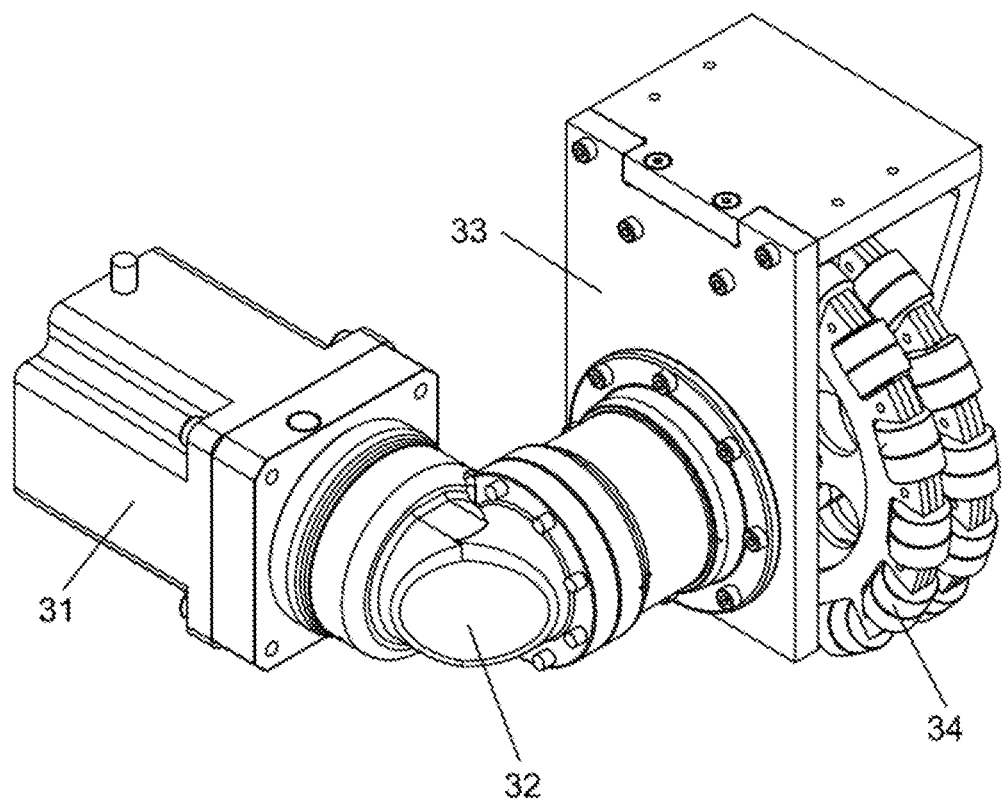
FIG. 3 is a stereogram of a set of gear train of the present invention.

Referring to FIGS. 1 to 3, the present invention provides a mobile robot triangle chassis assembly, which comprises a housing 11, a top plate 12, an isolation plate 13, a bottom plate 14, a power package, multiple support beams 15 and three sets of gear trains 30, wherein the top plate 12 and the bottom plate 14 are distributed up and down; the isolation plate 13 is located between the top plate 12 and the bottom plate 14; the top plate 12, the bottom plate 14 and the isolation plate 13 are fixedly connected with each other through the support beams 15; the power package is fixedly connected with the isolation plate 13; an upper end of the support beams 15 is fixedly connected with a lower surface of the top plate 12; a lower end of the support beams 15 is fixedly connected with an upper surface of the bottom plate 14; the isolation plate 13 is fixedly connected with the support beams 15.

The three sets of gear trains 30 are equilaterally triangularly distributed. The three sets of gear trains 30, which are in a triangle clockwise rotation distribution, enhance the stability of the robot walking. Each set of gear train 30 comprises a motor 31, a speed reducer 32, a support frame 33 and an omnidirectional wheel 34, wherein the omnidirectional wheel 34 is a double-row omnidirectional wheel; an upper end of the support frame 33 is fixedly connected with a lower surface of the isolation plate 13; a lower end of the support frame 33 is fixedly connected with the upper surface of the bottom plate 14; the omnidirectional wheel 34 is located within the support frame 33 and driven by the motor 31 and the speed reducer 32; the speed reducer 32 is fixedly connected with the support frame 33; the motor 31 is fixedly connected with the speed reducer 32; a driver 40 for controlling all three motors 31 is located at the upper surface of the bottom plate 14; the bottom plate 14 has three through-holes 141; a bottom of the omnidirectional wheel 34 is located outside the through-holes 141; the speed reducer 32 is a bevel gear speed reducer; an outer periphery of the speed reducer 32 is bent at an angle of 90 degrees. The mobile robot triangle chassis assembly has a double-layer structure, the three sets of gear trains 30 are located at a lower layer of the double-layer structure, and the power package is located at an upper layer of the double-layer structure, so as to reduce an occupied area of the mobile robot triangle chassis assembly.

The power package comprises a lithium power supply 21, a DC-DC (direct current-direct current) module 22, an aerial socket 23, a switching-charging integrated module 24 and multiple battery flanges 25, wherein the battery flanges 25 are fixedly connected with an upper surface of the isolation plate 13; the lithium power supply 21 is fixedly connected with the isolation plate 13 through the battery flanges 25; the aerial socket 23 is located between the top plate 12 and the isolation plate 13; the DC-DC module 22 is fixedly connected with the lower surface of the isolation plate 13; the switching-charging integrated module 24 is located at a surface of the housing 11. In the mobile robot triangle chassis assembly of the present invention, only the bottom of the omnidirectional wheel 34 is located outside the bottom plate 14, so that components within the mobile robot triangle chassis assembly are protected. Furthermore, the power package is located on the isolation plate 13 higher than the three sets of gear trains 30 to be more sufficiently protected.

What is claimed is:

1. A mobile robot triangle chassis assembly comprising: a housing (11), a top plate (12), an isolation plate (13), a bottom plate (14), a power package, multiple support beams (15) and three sets of gear trains (30), wherein the top plate (12) and the bottom plate (14) are distributed up and down; the isolation plate (13) is located between the top plate (12) and the bottom plate (14); the top plate (12), the bottom plate (14) and the isolation plate (13) are fixedly connected with each other through the support beams (15); the power package is fixedly connected with the isolation plate (13);

the three sets of gear trains (30) are equilaterally triangularly distributed, each of the three sets of gear trains (30) comprises a motor (31), a speed reducer (32), a support frame (33) and an omnidirectional wheel (34), wherein an upper end of the support frame (33) is fixedly connected with a lower surface of the isolation plate (13); a lower end of the support frame (33) is fixedly connected with an upper surface of the bottom plate (14); the omnidirectional wheel (34) is located within the support frame (33) and driven by the motor (31) and the speed reducer (32); the speed reducer (32) is fixedly connected with the support frame (33); the motor (31) is fixedly connected with the speed reducer (32); a driver (40) for controlling all three motors (31) is located at the upper surface of the bottom plate (14); the bottom plate (14) has through-holes (141); a bottom of the omnidirectional wheel (34) is located outside the through-holes (141);

the speed reducer (32) is a bevel gear speed reducer, and an outer periphery of the speed reducer (32) is bent at an angle of 90 degrees.

2. The mobile robot triangle chassis assembly, as recited in claim 1, wherein an upper end of the support beams (15) is fixedly connected with a lower surface of the top plate (12), a lower end of the support beams (15) is fixedly connected with the upper surface of the bottom plate (14), the isolation plate (13) is fixedly connected with the support beams (15).

3. The mobile robot triangle chassis assembly, as recited in claim 1, wherein the power package comprises a lithium power supply (21), a DC-DC (direct current-direct current) module (22), an aerial socket (23), a switching-charging integrated module (24) and multiple battery flanges (25), wherein the battery flanges (25) are fixedly connected with an upper surface of the isolation plate (13); the lithium power supply (21) is fixedly connected with the isolation plate (13) through the battery flanges (25); the aerial socket (23) is located between the top plate (12) and the isolation plate (13); the DC-DC module (22) is fixedly connected with the lower surface of the isolation plate (13); and the switching-charging integrated module (24) is located at a surface of the housing (11).

* * * * *